(12) United States Patent
Cleveland, III

(10) Patent No.: US 6,267,681 B1
(45) Date of Patent: Jul. 31, 2001

(54) SOCKET WRENCH DEVICE

(75) Inventor: Orison Cleveland, III, Palm Bay, FL (US)

(73) Assignee: Cleveland Tool Corporation, Palm Bay, FL (US)

( * ) Notice: Subject to any disclaimer, the term of this patent is extended or adjusted under 35 U.S.C. 154(b) by 0 days.

(21) Appl. No.: 09/426,936

(22) Filed: Oct. 22, 1999

(51) Int. Cl.$^7$ ..................................... F16D 3/16
(52) U.S. Cl. ................ 464/119; 464/106; 464/905; 464/185; 81/177.75
(58) Field of Search .................. 464/106, 112, 464/113, 114, 116, 117, 118, 119, 905, 185; 81/177.75, 177.6

(56) References Cited

U.S. PATENT DOCUMENTS

| | | |
|---|---|---|
| 1,102,863 | 7/1914 | Bojas . |
| 1,324,898 | 12/1919 | Hopcraft . |
| 1,485,036 | 2/1924 | Kingsley . |
| 2,196,297 | 4/1940 | Gagne . |
| 2,327,821 | 8/1943 | Rueb . |
| 2,499,569 | 3/1950 | Cooley . |
| 3,122,901 | 3/1964 | Thompson . |
| 3,522,713 | 8/1970 | Hayes . |
| 4,065,941 | 1/1978 | Aoki . |
| 4,075,913 | 2/1978 | Tye . |
| 4,721,493 | 1/1988 | Lane . |
| 5,458,028 | * 10/1995 | Cleveland, III ............ 464/119 |

OTHER PUBLICATIONS

U.S. Patent Application Ser. No. 08/192,359, filed Feb. 7, 1994, by George P. Juliano.

* cited by examiner

Primary Examiner—Lynne H. Browne
Assistant Examiner—Aaron Dunwoody
(74) Attorney, Agent, or Firm—Troutman Sanders LLP; Wm Brook Lafferty

(57) ABSTRACT

An improved universal joint device for socket wrenches. The improved device is constructed with exposed friction bearing surface portions on the handle and socket portions of the device for receiving the ends of a coil spring which maintains the universal joint in alignment during both tension and compression. The friction bearing surface portions are preferably knurled teeth positioned on the periphery of the handle and socket sections. The device is otherwise free of grooves or apertures for mounting the spring to the handle and socket portions.

12 Claims, 4 Drawing Sheets

SOCKET WRENCH DEVICE

TECHNICAL FIELD

The present invention relates to a spring loaded tool device. This invention more particularly pertains to a spring-loaded, variable tension, self-aligning universal joint adapter system for socket wrenches.

BACKGROUND OF THE INVENTION

The tool-making industry manufactures a myriad of adapters for its tools. One known type of adapter is a universal joint adapter for use with socket wrenches. This known universal adapter typically includes: a handle portion and a socket portion. Each end portion includes a bifurcated or forked end yoke member with a pair of arms. A swivel block pivotally connects the handle and socket portions via each pair of arms. A spring surrounds the swivel block and the handle and socket portions. The spring encircling the end portions and swivel block permits a user to hold a socket wrench in alignment with a nut or bolt, for example, without having to re-apply the wrench to the object several times. Without the spring, the end portions of the universal joint would not be able to maintain a desired angle or be maintained in concentric alignment.

There are a number of known methods for coupling the ends of the spring to the end portions of the device. One known method is to provide an aperture in each end portion for receiving and securing an end of the spring. In this embodiment, each end of the spring is configured to define a projection which extends radially inward. The radially extending ends are sized and configured to be retained in the aperture of each end portion. In other words, each end of the spring terminates in the aperture in the end portions. In this embodiment, the interconnection of the spring and the end portion is difficult to terminate because the radially extending ends typically have to be pried out of the apertures to remove the spring from encircling the end members and the swivel block.

However, a spring coupled in this manner is not capable of providing simultaneous exertion of compression and tension forces on opposing sides of the handle and socket portions because the spring is only mounted at one point along the circumference of each end portion. A single point of contact can not simultaneously exert opposing compression and tension forces on opposite end portions. Accordingly, this method requires a spring having a substantially greater wire diameter (making the spring substantially stiffer) in order that the forces exerted by the spring at each single point of contact do not bias the device in a non-axially aligned manner. Such stiff springs are detrimental to the goal of flexibility of the device.

In a second embodiment for coupling the spring to the handle and socket portions, the spring is mounted in annular groves positioned in both the handle portion and the socket portion. This manner of coupling the spring to the handle and socket portions is disclosed in my U.S. Pat. No. 5,458,028, entitled "SOCKET WRENCH DEVICE", the entire disclosure of which is incorporated herein by reference. This patent discloses annular groves in the end portions having outer and inner lips or shoulders which define the inner and outer boundaries of the grooves within the socket and handle portions, respectively. By mounting the spring in this manner, the end portions are coaxially aligned in both tension and compression. However, machining such annular groves adds significant expense in manufacture, and these annular grooves do not permit the spring to be removed from the handle and socket portions in an easy manner. The difficulty in removing the spring can be remedied by double voids in the inner lip of a groove at one end of the device, as disclosed in my earlier patent. The purpose of the voids is to create a gap between the spring and the underlying lip or grove to facilitate removal and replacement of the spring. These voids may be obtained by machining away a portion of the outer surface of the lip. However, because of the orientation of the device as well as the location of the lip, machining the outer surface of the lip or groove is often a difficult machining operation, adding further manufacturing cost.

In response to the realized inadequacies of these known socket wrench devices, it became clear there is a need in the art for an easier and more economical manner of coupling the spring to the socket and handle portions of the device. This new socket wrench device must be capable of imparting both compression and tension forces to each yoke simultaneously and without slippage. Moreover, this new socket wrench device must permit the spring to be removed and replaced in an easy and economical manner.

SUMMARY OF THE INVENTION

The present invention solves the above-identified problems by providing an improved socket wrench device. The present invention seeks to provide an efficient method of mounting a coil spring to portions to a universal joint, while satisfying the need for imparting both compression and tension forces to each yoke simultaneously, which permits an advantageous reduction in spring strength and stiffness. Moreover, this new socket wrench device must permit the spring to be removed and replaced in an easy and economical manner.

Generally described, the present invention includes a universal joint having a handle portion and a socket portion. A swivel block is pivotally connected to both the handle and socket portions. The invention further includes a concentric aligning spring encircling the handle and socket portions and the swivel block for providing self-aligning forces.

The ends of the spring are coupled to the handle and socket portions by providing an exposed frictional surface portion at least partially around the circumference of each of the handle and socket portions. When the spring is mounted on the handle and socket portions, the frictional surface portions contact the inner diameter of each end of the spring. The handle and socket portions are otherwise free of grooves, holes or other recessed means for retaining the ends of the spring.

In accordance with one embodiment of the present invention, the exposed frictional surface portion is an annular knurled portion on both the handle and socket portions. Each knurled portion underlies one of the ends of the spring such that the knurled portions grip the inner diameter of the ends of the spring. By interconnecting the handle and socket portions of the device with the ends of the springs in such a manner, the spring of the socket wrench device is able to hold the handle and socket portions in alignment during both compression and tension, while also allowing the spring to be easily removed and replaced when the device is no longer in use, or when other performance characteristics are desired.

The foregoing has outlined rather broadly, the more pertinent and important features of the present invention. The detailed description of the invention that follows is offered so that the present contribution to the art can be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Similar reference characters refer to similar parts throughout several views of the drawings.

DETAILED DESCRIPTION

Figure 1:
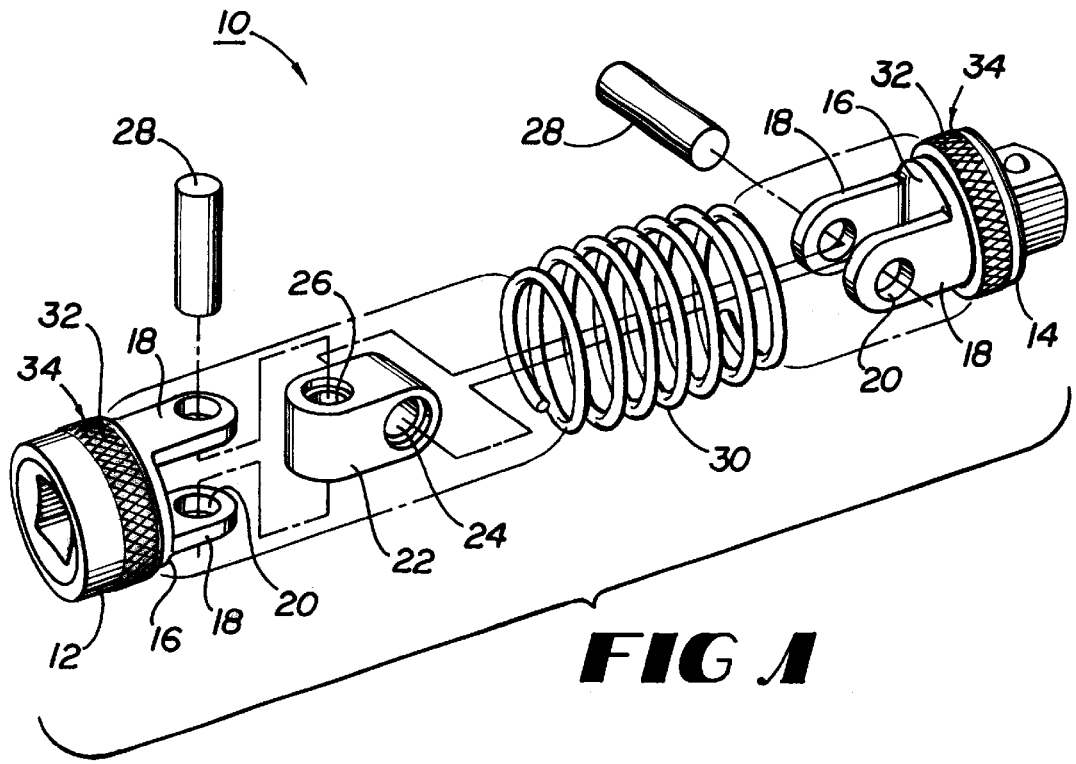
FIG. 1 is an exploded perspective view of the socket wrench device of the present invention.

Referring now to the drawing in which like numerals indicate like elements throughout the several views, FIG. 1 illustrates an exemplary embodiment of a socket wrench device 10. Generally described, the socket wrench device 10 includes a universal joint having a handle portion 12 and a socket portion 14. Both the handle portion 12 and the socket portion 14 includes a bifurcated or forked end yoke member 16. Each end yoke member 16 includes a pair of arms 18 having a bore hole 20 therethrough.

The socket wrench device 10 of the present invention further includes a swivel block 22 with a pair of axially perpendicular holes 24 and 26. The swivel block 22 is inserted between both pairs of arms 18 of the forked members 16 to pivotally connect the handle and socket portions 12, 14 together. The swivel block 22 is maintained between the handle and socket portions 12, 14 by pins 28 which are press fitted through the bore holes 20 and the corresponding axially perpendicular holes 24, 26.

Figure 2A:
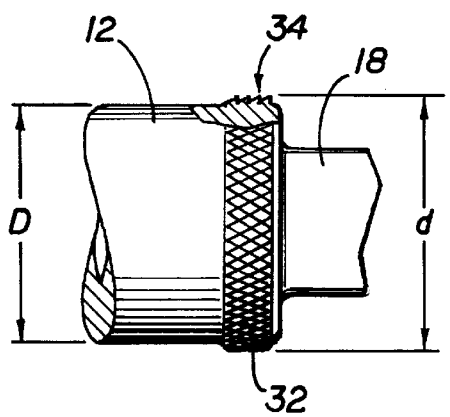
FIGS. 2A and 2B are partial side elevation views of different embodiments of the socket wrench device illustrating an enlarged view of the handle portion.
Figure 2B:
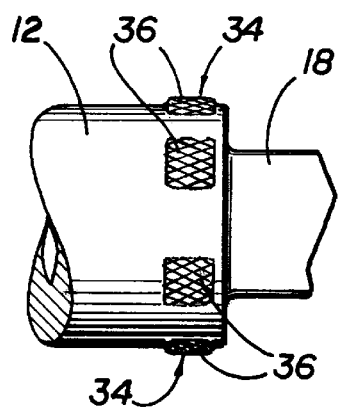

A coil spring 30 surrounds the swivel block 22 and is mounted to the handle and socket portions 12, 14 by contacting exposed friction bearing surface portions on both portions 12, 14 such that the device 10 can hold the spring 30 in place during both tension and compression. FIGS. 2A and 2B best illustrate exposed friction bearing surface portions on the handle portion 12. The friction bearing surface portion is machined into the surface of the handle and socket portions in a manner similar to that utilized for placing knurled teeth on the handles of tools to provide a grip. Because the present invention does not require annular grooves in the handle and socket portions, less material is required to manufacture the handle and socket portions resulting in the handle and socket portions having a smaller outer diameter. Consequently, the socket wrench device 10 may be made smaller. Also, no additional material is added to create the knurled teeth during the machining process. However, those skilled in the art understand that a variety of methods may be used to create a raised surface upon the periphery of an object to create a friction bearing surface.

FIG. 2A illustrates a partial elevation view of the handle portion 12 having an annular friction bearing surface portion 32. In this embodiment, the friction bearing surface portion 32 is a plurality of knurled teeth 34 on the surface of the handle portion 12. The knurled teeth 34 encircle the entire 360 degree periphery of the handle portion 12, so that when the end of the spring 30 is placed on to the handle portion 12, the end of the spring comes into contact with the knurled teeth 34. Typically, the spring 30 is installed by hand by threading the spring 30 against the handle and socket portions 12, 14 until the ends of the spring are positioned in the desired location upon the knurled teeth 34 of the friction bearing surface 32.

Each end of the spring 30 is able to remain in contact with the knurled teeth 34 because the knurled teeth 34 have a slightly increased outer diameter on the handle portion 12. In FIGS. 2A and 2B, the outer diameter of the portion of the handle portion without the knurled teeth is shown generally by reference letter D, and the outer diameter of the portion of the handle portion with the friction bearing surface 32 is shown generally by the reference letter d. For example, when utilizing a ¾"×2¹¹⁄₁₆" steel universal joint from Boston Gear Works, North Quincy, Mass., the outer diameter of the portions without teeth is approximately 0.750 inches and the outer diameter of the friction bearing surface portions of knurled teeth is approximately 0.764 inches. Also, when utilizing a standard ⅜" Cleveland type U-joint, the outer diameter is approximately 0.738 inches without the knurled teeth and the outer diameter with the knurled teeth is approximately 0.752 inches.

It is possible to create a broad range of friction bearing surface portions from a very fine grip having a large number of teeth per inch to a coarse grip having a small number of teeth per inch. Generally, the number of knurled teeth per inch should range from 10 to 80 knurled teeth per inch. Preferably, the friction bearing surface portion should include 16 knurled teeth per inch of surface which is usually sufficient to retain the spring on the handle and socket portions 12, 14. Although the exposed friction bearing surface is described in FIGS. 2A and 2B as existing on the handle portion 12, exposed friction bearing surfaces also exist upon the socket portion 14 as shown in the other Figures.

FIG. 2B illustrates an alternative embodiment of the exposed friction bearing surface portion. In FIG. 2B, the handle portion 12 includes an annular array of friction bearing surface segments 36 positioned equidistant apart from one another. Each friction bearing surface segment 36 includes a plurality of knurled teeth 34. An important aspect of the embodiment shown in FIG. 2B is that each segment 36 of knurled teeth 34 is placed an equal distant apart so that the spring 30 may be retained on the handle portion 12 and the socket portion 14 in a manner that is capable of imparting both compression and tension forces to each yoke member 16 simultaneously. Although the exposed friction bearing surface portions 32, 36 of the present invention is described as having knurled teeth 34, alternative embodiments of the exposed friction bearing surface portion of the present invention can exist that utilizes an exposed finish on a portion of the surface of an object to generate increased friction between parts in contact with one another such that the parts may not be separated from one another without requiring additional force.

Figure 3A:
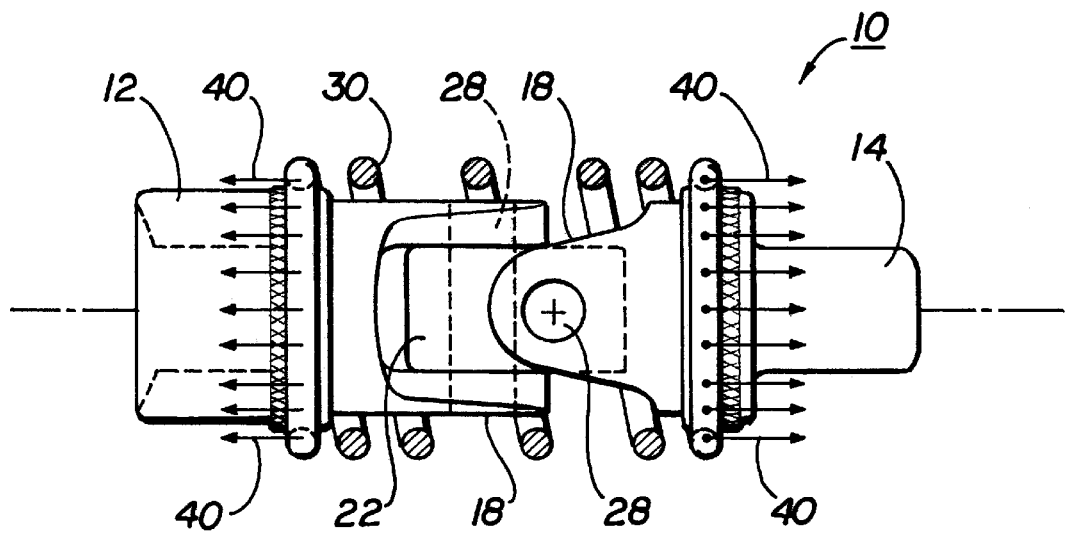
FIGS. 3A and 3B are side elevation views of the present invention illustrating variable force vectors created by the coil spring when the universal joint of the device is in an axially aligned position or pivoted into an axially deflected position, respectively.
Figure 3B:
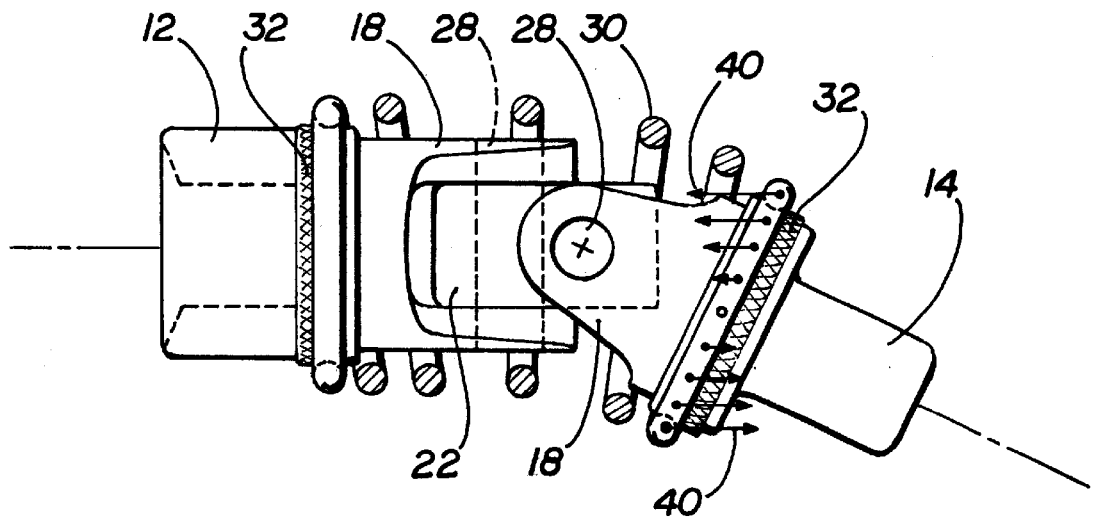
Figure 4A:
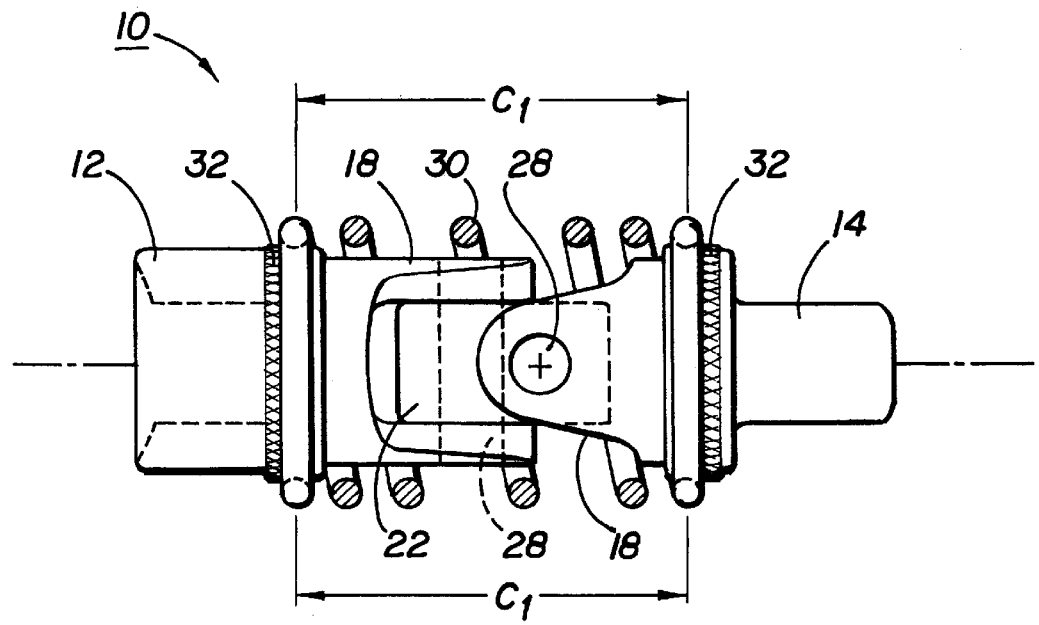
FIG. 4A illustrates the device in axial alignment with normal spring compression $C_1$.
Figure 4B:
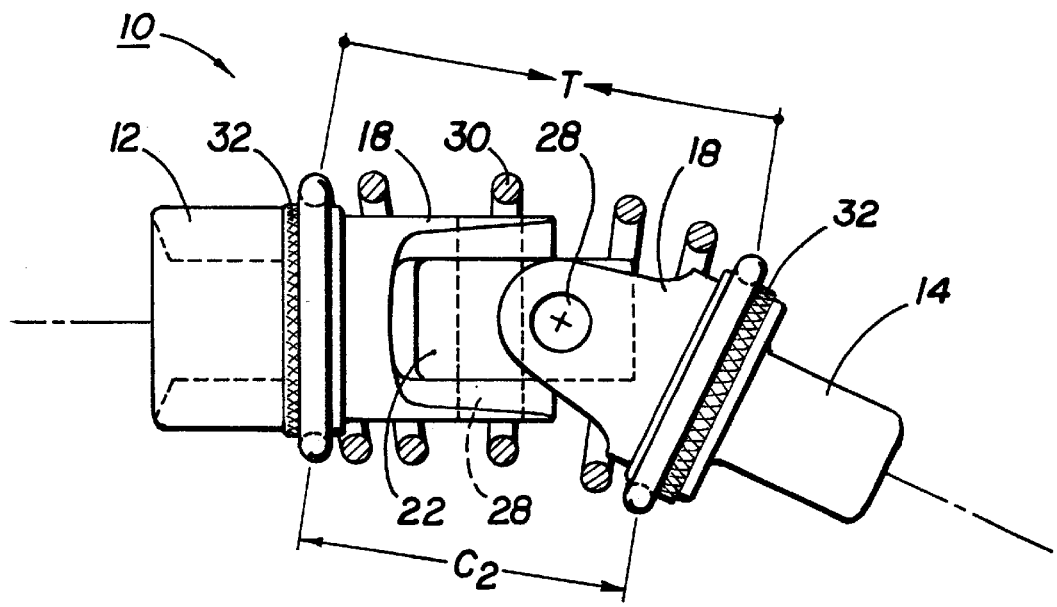
FIG. 4B illustrates the device having axial deflection with increased spring compression $C_2$ and spring tension T.
Figure 5A:
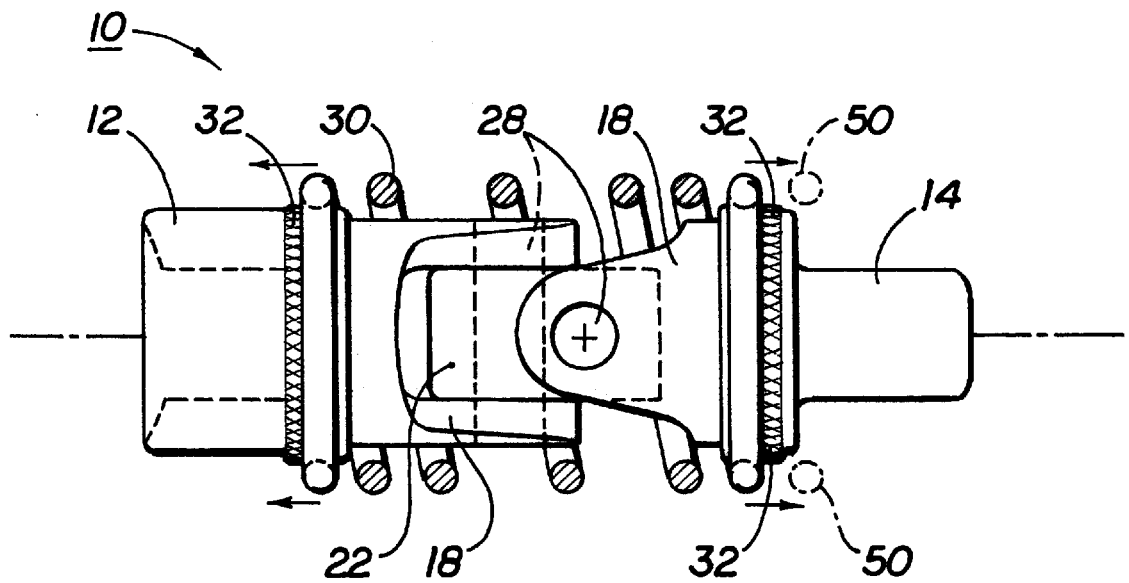
FIGS. 5A and 5B illustrate the location of the memory position while the device is pivoted between the axially aligned position and the axially deflected position.
Figure 5B:
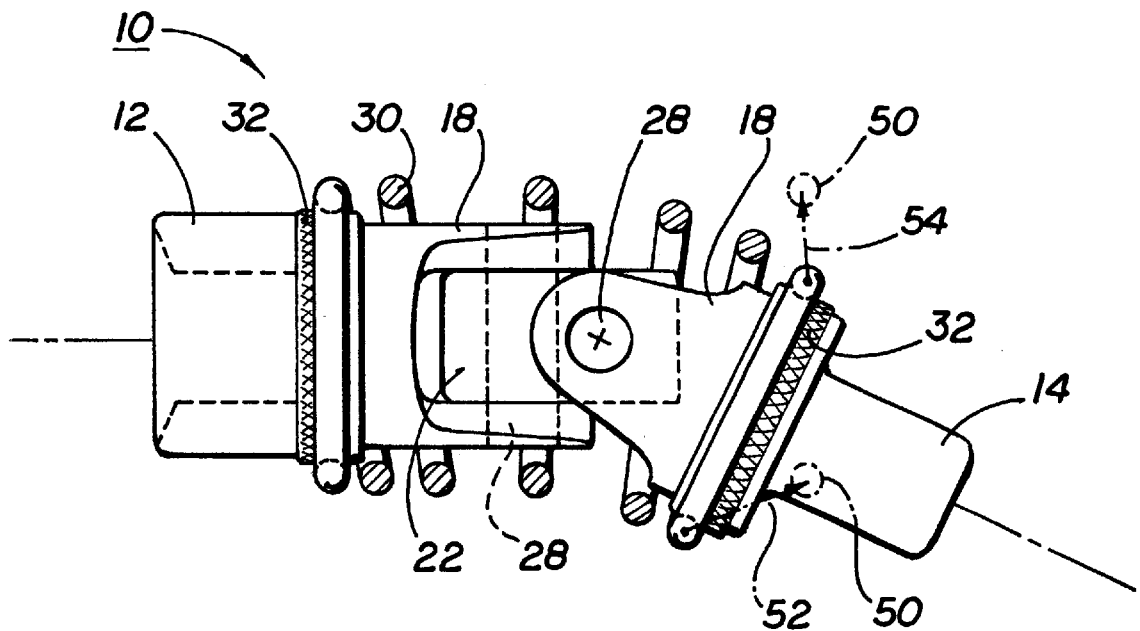

FIGS. 3A and 3B illustrate variable force vectors 40 created by the coil spring 30 when the universal joint of the device 10 is in an axially aligned position or pivoted into an axially deflected position, respectively. As best shown in FIG. 3A, the compression and tension forces shown by vectors 40 are applied from the spring 30 to the yoke 16 about the 360 degree periphery of the socket portion 14. FIG. 3B then depicts the opposing compression and tension forces shown by vectors 40 upon the yoke 16 of the socket portion 14 when the device 10 is oriented into the axially deflected position. The device 10 has a normal spring compression while in the axially aligned position. FIG. 4A illustrates the device 10 in the axially aligned position with a normal spring compression $C_1$. In FIG. 4B, however, the device 10 in the axially deflected position has an increased spring compression $C_2$ and spring tension T. Finally, FIGS. 5A and 5B illustrate the location of the memory position of the spring 30, identified by reference number 50, 30 while the device 10 is pivoted between the axially aligned position and the axially deflected position, respectively. During axial deflection, the forces acting at the end coil of spring 30 to return to the memory position 50 are identified by reference numbers 52 and 54. FIGS. 3B, 4B and 5B illustrate that the device 10 with exposed friction bearing surface portions 32, 36 has the ability to impart both compression and tension forces to each yoke simultaneously.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is described by the appended claims and supported by the foregoing description.

What is claimed is:

1. A universal joint device for a socket wrench, comprising:
    a handle portion having a forked end member and an exposed friction bearing surface portion extending at least partially around the periphery surface of said handle portion;
    a socket portion having a forked end member and an exposed friction bearing surface portion extending at least partially around the periphery surface of said socket portion;
    an intermediate swivel block;
    means for providing a first pivotal connection of said forked end member of said handle portion to said handle swivel block, and means for providing a second pivotal connection of the forked end member of said socket portion to said swivel block, such that the axes of said first and second pivotal connections are at substantially right angles to each other; and
    a spring concentric with and encircling said swivel block, said spring mounted to said handle and socket portions by contacting said friction bearing surface portions so as to retain said spring in both tension and compression, wherein said device is otherwise free of recessed and aperture means for mounting said spring to said handle and socket portions.

2. The universal joint device of claim 1 wherein said forked end members of said handle portion and said socket portion are each provided with a pair of arms having bore holes, wherein said swivel block is provided with a pair of axially perpendicular holes bored therethrough, and wherein said first and second pivotal connections means each include a pin for pivotally connecting the respective handle portion or socket portion with said swivel block through said bore holes in said pair of arms of said forked end member and through one of the holes in said swivel block.

3. The universal joint device of claim 1 wherein each said exposed friction bearing surface portion is a knurled surface.

4. The universal joint device of claim 3 wherein each said knurled surface is a plurality of knurled teeth in a range of approximately 10 to 80 knurled teeth per inch about said handle and socket portions.

5. The universal joint device of claim 4 wherein each said knurled surface includes 16 knurled teeth per inch about said handle and socket portions.

6. The universal joint device of claim 1 wherein said friction bearing surface portions extend entirely around the periphery of each said handle and socket portion.

7. The universal joint device of claim 1 wherein said friction bearing surface portion on each of said handle and socket portions comprises an annular array of friction bearing surface segments positioned equidistant apart from one another.

8. The universal joint device of claim 1 wherein the outer diameter about said handle portion at said friction bearing surface portion is greater than the outer diameter about said handle portion without said friction bearing surface portion.

9. The universal joint device of claim 1 wherein the outer diameter about said socket portion at said friction bearing surface portion is greater than the outer diameter about said socket portion without said friction bearing surface portion.

10. A universal joint device for a socket wrench, comprising:
    a handle portion having a forked end member and an exposed knurled surface extending at least partially around the periphery surface of said handle portion;
    a socket portion having a forked end member and an exposed knurled surface extending at least partially around the periphery surface of said socket portion;
    an intermediate swivel block;
    means for providing a first pivotal connection of said forked end member of said handle portion to said handle swivel block, and means for providing a second pivotal connection of the forked end member of said socket portion to said swivel block, such that the axes of said first and second pivotal connections are at substantially right angles to each other; and
    a spring concentric with and encircling said swivel block, said spring mounted to said handle and socket portions by contacting said knurled surfaces so as to retain said spring in both tension and compression.

11. A universal joint device for a socket wrench, comprising:
    a handle portion having a forked end member and an exposed friction bearing surface portion extending at least partially around the periphery surface of said handle portion, the outer diameter about said handle portion at said friction bearing surface portion being greater than the outer diameter about said handle portion without said friction bearing surface portion;
    a socket portion having a forked end member and an exposed friction bearing surface portion extending at least partially around the periphery surface of said socket portion;
    an intermediate swivel block;
    means for providing a first connection of said forked end member of said handle portion to said handle swivel block, and means for providing a second pivotal connection of the forked end member of said socket portion to said swivel block, such that the axes of said first and second pivotal connections are at substantially right angles to each other, and a spring concentric with and encircling said swivel block, said spring mounted to said handle and socket portions by contacting said friction bearing surface portions so as to retain said spring in both tension and compression.

12. A universal joint device for a socket wrench, comprising:

- a handle portion having a forked end member and an exposed friction bearing surface portion extending at least partially around the periphery surface of said handle portion;
- a socket portion having a forked end member and an exposed friction bearing surface portion extending at least partially around the periphery surface of said socket portion, the outer diameter about said socket portion at said friction bearing surface portion being greater than the outer diameter about said socket portion without said friction bearing surface portion;
- an intermediate swivel block;
- means for providing a first pivotal connection of said forked end member of said handle portion to said handle swivel block, and means for providing a second pivotal connection of the forked end member of said socket portion to said swivel block, such that the axes of said first and second pivotal connections are at substantially right angles to each other; and
- a spring concentric with and encircling said swivel block, said spring mounted to said handle and socket portions by contacting said friction bearing surface portions so as to retain said spring in both tension and compression.

* * * * *